United States Patent
Wu et al.

(10) Patent No.: US 12,548,555 B2
(45) Date of Patent: Feb. 10, 2026

(54) JOINT TRAINING OF SPEECH RECOGNITION AND SPEECH SYNTHESIS MODELS FOR CONVERSATIONAL AI SYSTEMS AND APPLICATIONS

(71) Applicant: NVIDIA Corporation, Santa Clara, CA (US)

(72) Inventors: Xianchao Wu, Tokyo (JP); Yi Dong, Lexington, MA (US); Scott Nunweiler, Yokohama (JP)

(73) Assignee: NVIDIA Corporation, Santa Clara, CA (US)

(*) Notice: Subject to any disclaimer, the term of this patent is extended or adjusted under 35 U.S.C. 154(b) by 272 days.

(21) Appl. No.: 18/347,031

(22) Filed: Jul. 5, 2023

(65) Prior Publication Data

US 2025/0014571 A1   Jan. 9, 2025

(51) Int. Cl.
*G10L 15/16*   (2006.01)
*G10L 13/00*   (2006.01)
*G10L 13/047*   (2013.01)
*G10L 15/06*   (2013.01)

(52) U.S. Cl.
CPC .......... *G10L 15/063* (2013.01); *G10L 13/047* (2013.01); *G10L 15/16* (2013.01); *G10L 2015/0635* (2013.01)

(58) Field of Classification Search
None
See application file for complete search history.

(56) References Cited

U.S. PATENT DOCUMENTS

| | | | |
|---|---|---|---|
| 2021/0350786 A1* | 11/2021 | Chen | G10L 13/08 |
| 2022/0005457 A1* | 1/2022 | Balakrishnan | G10L 15/16 |
| 2023/0023691 A1* | 1/2023 | Knerr | G10L 25/51 |
| 2023/0298567 A1* | 9/2023 | Tan | G10L 13/04 704/243 |
| 2024/0289563 A1* | 8/2024 | Ramanovich | G10L 25/18 |

OTHER PUBLICATIONS

Ren, Yi, et al. "Almost unsupervised text to speech and automatic speech recognition." International conference on machine learning. PMLR, 2019. (Year: 2019).*

He, Di, et al. "Dual learning for machine translation." Advances in neural information processing systems 29 (2016). (Year: 2016).*

(Continued)

*Primary Examiner* — Douglas Godbold
(74) *Attorney, Agent, or Firm* — Lowenstein Sandler LLP

(57) ABSTRACT

Disclosed are systems and techniques for training machine learning models. The techniques include providing a first data of a first modality as input to a first machine learning model to obtain a first output of a second modality, providing the first output of the second modality as input to a second machine learning model to obtain a second output of the first modality, providing the first data as input to a third machine learning model to obtain a first tensor, providing the second output as input to the third machine learning model to obtain a second tensor, calculating a first loss based on a comparison between the first tensor and the second tensor, and causing the first machine learning model to be modified based on the first loss.

16 Claims, 6 Drawing Sheets

(56) References Cited

OTHER PUBLICATIONS

Karita, Shigeki, et al. "Semi-supervised end-to-end speech recognition using text-to-speech and autoencoders." ICASSP 2019—2019 IEEE International Conference on Acoustics, Speech and Signal Processing (ICASSP). IEEE, 2019. (Year: 2019).*

Wang, Zhendong, et al. "Diffusion-gan: Training gans with diffusion." arXiv preprint arXiv:2206.02262 (2022). (Year: 2022).*

Baevski, et al., "wav2vec 2.0: A Framework for Self-Supervised Learning of Speech Representations," 34th Conference on Neural Information Processing Systems (NeurIPS 2020), Vancouver, Canada, 12 pages. https://proceedings.neurips.cc/paper/2020/file/92d1e1eb1cd6f9fba3227870bb6d7f07-Paper.pdf.

Baevski, et al., "Unsupervised speech recognition," 35th Conference on Neural Processing Systems (NeurIPS 2021), 14 pages. https://proceedings.neurips.cc/paper/2021/file/ea159dc9788ffac311592613b7f71fbb-Paper.pdf.

Blei, et al., "Variational Inference: A Review for Statisticians," Journal of the American Statistical Association (2017), 112:518, 859-877. DOI: 10.1080/01621459.2017.1285773.

Devlin, et al., "BERT: Pre-training of Deep Bidirectional Transformers for Language Understanding," Proceedings of NAACL-HLT 2019, pp. 4171-4186. doi: 10.18653/v1/N19-1423. https://aclanthology.org/N19-1423.

Endres and Schindelin, "A New Metric for Probability Distributions," IEEE Transactions on Information Theory, 49(7):1858-1860, 2003. doi: 10.1109/TIT.2003.813506.

Gulrajani, et al., "Improved Training of Wasserstein GANS," Proceedings of the 31st NeurIPS, NIPS'17, pp. 5769-5779, 2017. ISBN 9781510860964.

Ho, et al., "Denoising Diffusion Probabilistic Models," arXiv:2006.11239v2 [cs.LG] Dec. 16, 2020, 25 pages. https://arxiv.org/abs/2006.11239.

Ho, et al., "Denoising Diffusion Probabilistic Models," 34th Conference on Neural Information Processing Systems (NeurIPS 2020), Vancouver, Canada, 12 pages. https://proceedings.neurips.cc/paper/2020/file/4c5bcfec8584af0d967f1ab10179ca4b-Paper.pdf.

Ni, et al., "Unsupervised Text-to-Speech Synthesis by Unsupervised Automatic Speech Recognition," arXiv:2203.15796v2 [eess.AS] Aug. 15, 2022, 5 pages. https://arxiv.org/abs/2203.15796.

Pratap et al., "MLS: A Large-Scale Multilingual Dataset for Speech Research," Interspeech 2020, Oct. 25-29, 2020, Shanghai, China, 2757-2761. doi:10.21437/interspeech.2020-2826. http://dx.doi.org/10.21437/Interspeech.2020-2826.

Ronneberger, et al., "U-Net: Convolutional Networks for Biomedical Image Segmentation," arXiv:1505.04597v1 [cs.CV] May 18, 2015, 8 pages. http://arxiv.org/abs/1505.04597.

Sohl-Dickstein, et al., "Deep Unsupervised Learning using Nonequilibrium Thermodynamics," Proceedings of the 32nd International Conference on Machine Learning, Lille, France, 2015, JMLR: W&CP vol. 37, 18 pages. http://arxiv.org/abs/1503.03585.

Song and Ermon, "Generative Modeling by Estimating Gradients of the Data Distribution," 33rd Conference on Neural Information Processing Systems (NEURIPS 2019), Vancouver, Canada, 13 pages. https://proceedings.neurips.cc/paper/2019/file/3001ef257407d5a371a96dcd947c7d93-Paper.pdf.

Vaswani, et al., "Attention Is All You Need," 31st Conference on Neural Information Processing Systems (NIPS 2017), Long Beach, CA, USA, 11 pages. https://proceedings.neurips.cc/paper/2017/file/3f5ee243547dee91fbd053c1c4a845aa-Paper.pdf.

Wang and Cho, "BERT has a Mouth, and It Must Speak: BERT as a Markov Random Field Language Model," Proceedings of the Workshop on Methods for Optimizing and Evaluating Neural Language Generation (NeuralGen), pp. 30-36, Minneapolis, Minnesota, USA, Jun. 6, 2019. doi: 10.18653/v1/W19-2304. https://aclanthology.org/W19-2304.

Wang, et al., "Diffusion-GAN: Training GANs with Diffusion," arXiv preprint arXiv:2206.02262v3 [cs.LG] Oct. 9, 2022, 28 pages. https://arxiv.org/abs/2206.02262.12.

* cited by examiner

JOINT TRAINING OF SPEECH RECOGNITION AND SPEECH SYNTHESIS MODELS FOR CONVERSATIONAL AI SYSTEMS AND APPLICATIONS

TECHNICAL FIELD

At least one embodiment pertains to a system for training unsupervised speech recognition and speech synthesis machine learning models.

BACKGROUND

Machine learning models can be trained to solve a variety of tasks. Specifically, some machine learning models can be trained to recognize speech (e.g., an automatic speech recognition (ASR) model) or synthesize speech (e.g., a text-to-speech (TTS) model). Training such a model often requires large amounts of labeled training data, which can be costly to obtain. There are large amounts of unlabeled data available, but unsupervised ASR models and unsupervised TTS models often suffer from unstable training and mode collapse problems.

DETAILED DESCRIPTION

Figure 1:
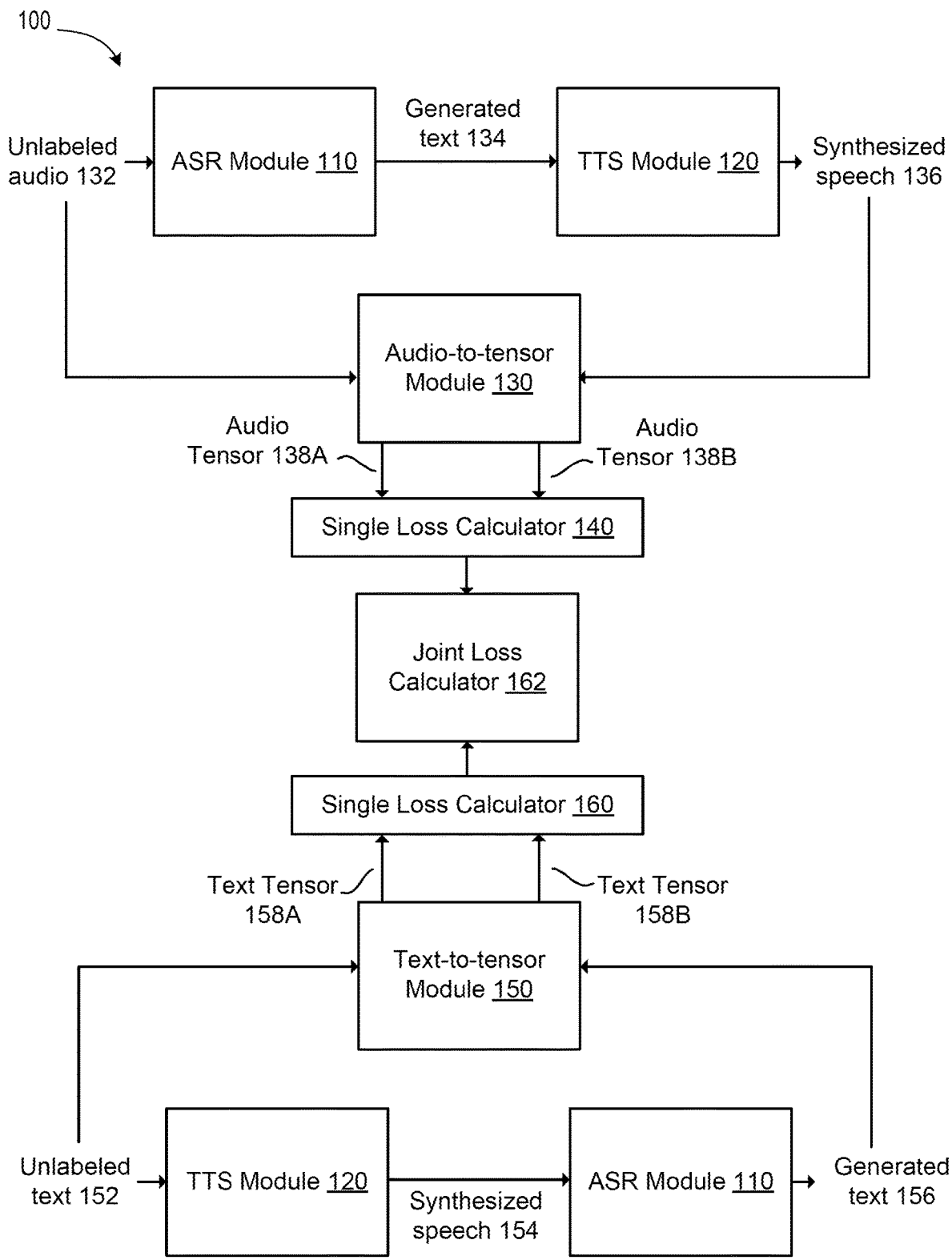
FIG. 1 illustrates an example data flow for calculating losses used for training unsupervised ASR and TTS models, according to at least one embodiment.

Many unsupervised ASR models (and/or unsupervised TTS models) are based on generative adversarial network (GAN) models, which suffer from unstable training and mode collapse problems. In a GAN model, a generator is trained to generate realistic outputs (e.g., images, text, speech waves, etc.), and a discriminator is trained to distinguish real outputs (e.g., labelled data in a training set) from generated outputs. Training the GAN model involves a delicate balance between the generator and the discriminator, and small changes to the model or the training procedure can cause oscillations in the loss function, making it difficult to converge to a stable solution (e.g., unstable training). In some cases, the generator may learn to generate a limited set of outputs that can fool the discriminator, instead of generating a diverse set of realistic outputs, leading to poor output quality and lack of diversity in the generated outputs (e.g., mode collapse).

Aspects and embodiments of the present disclosure address these and other technological challenges by providing systems and techniques that calculate a joint loss between multiple unsupervised diffusion-GAN models to improve an accuracy of the models. To calculate a loss of a model (e.g., determine an accuracy or precision of a machine learning model), a first input of a first modality may be received. The first modality may be text-based or audio-based. The first input may be provided to a first diffusion-GAN model (e.g., a machine learning model that includes a generator, multiple, timestep-dependent discriminators, and a diffusion process) that generates a first output of a second modality. The first output may be provided to a second diffusion-GAN model that generates a second output of the first modality. In some embodiments, the first diffusion-GAN model is an unsupervised TTS model and the second diffusion-GAN model is an unsupervised ASR model. For example, the first input may be a text. The text may be provided as an input to the unsupervised TTS model that converts the text to audio (e.g., a mel-spectrogram, WAV audio sequence, etc.). The audio may then be provided to the unsupervised ASR model that converts the audio back to text. In some embodiments, the diffusion-GAN models are switched, such that the first diffusion-GAN model is an unsupervised ASR model and the second diffusion-GAN model is an unsupervised TTS model.

A first machine learning model may then convert the first input, which is of the first modality, into a first tensor (e.g., one or more vectors within an embedding space) and convert the output of the second diffusion-GAN model, which is also of the first modality, into a second tensor. The first tensor and the second tensor may be compared (e.g., using a minimum squared error (MSE) function, cosine similarity function, etc.) to determine a similarity, and a first loss may be calculated based on a difference (e.g., $L_1$ distance, $L_2$ distance, etc.) between the two tensors. Based on the first loss, the first diffusion-GAN model may be modified to improve the output of the model.

To calculate a loss for the second diffusion-GAN, a second input of the second modality may be received. The second input may be provided as input to the second diffusion-GAN model, which generates a third output of the first modality. The third output may be provided to the first diffusion-GAN model, which generates a fourth output of the first modality. A second machine learning model may then convert the second input, which is of the second modality, into a third tensor and the fourth output, which is also of the second modality, into a fourth tensor. The third tensor and the fourth tensor may be compared to determine a similarity, and a second loss may be calculated based on the difference. Based on the second loss, the second diffusion-GAN model may be modified to improve the output of the model.

In some embodiments, a joint loss may be calculated by combining the first loss with the second loss. In some embodiments, the first loss and/or the second loss may be weighted by an associated weight parameter. The first diffusion-GAN model and/or the second diffusion-GAN model may be modified based on the joint loss to improve an output of the model and to reduce the joint loss.

The advantages of the disclosed techniques include but are not limited to improving an accuracy of a diffusion-GAN model without requiring labelled datasets, resulting in decreasing the time and resources required to train an unsupervised diffusion-GAN model.

The systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., an in-vehicle infotainment system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems implementing one or more language models—such as large language models (LLMs), systems for performing light transport simulation, systems for performing collaborative content creation for 3D assets, systems implemented at least partially using cloud computing resources, and/or other types of systems.

System Architecture

FIG. 1 illustrates an example data flow 100 for calculating losses used for training unsupervised ASR and TTS models, according to at least one embodiment. For example, an unlabeled audio 132 may be received and may be provided to automatic speech recognition (ASR) module 110. ASR module 110 may include an unsupervised machine learning model used to convert speech to text. In some embodiments, ASR module 110 includes a diffusion-GAN model. Unlabeled audio 132 may be a WAV file, a mel-spectrogram, and/or any other format accepted by ASR module 110. In some embodiments, unlabeled audio 132 is converted from an initial format to an input format that is accepted by ASR module 110 before being processed by ASR module 110.

ASR module 110 may convert unlabeled audio 132 to generated text 134, which may be a textual representation of the speech data of unlabeled audio 132. Generated text 134 may then be provided to text-to-speech (TTS) module 120. TTS module 120 may include an unsupervised machine learning model used to convert text to speech. In some embodiments, TTS module 120 includes a diffusion-GAN model. TTS module 120 may receive text data and may output audio data corresponding to the text. For example, TTS module 120 may generate synthesized speech 136 based on generated text 134. In some embodiments, TTS module 120 may output a WAV audio file. In some embodiments, TTS module 120 may output a mel-spectrogram that can be converted to an audio file (e.g., using a vocoder).

Unlabeled audio 132 may be provided to audio-to-tensor module 130 to convert the audio to a dense tensor representation (e.g., audio tensor 138A). For example, audio-to-tensor module 130 may receive multiple frames of mel-spectrograms and may convert each frame into a vector within an embedding space. All of the vectors may be combined to form a tensor. In some embodiments, audio-to-tensor module 130 may be a Wav2Vec model. Synthesized speech 136 may also be provided to audio-to-tensor module 130 to convert the generated audio to a dense tensor representation (e.g., audio tensor 138B). Single loss calculator 140 may calculate a first loss based on a comparison of audio tensor 138A to audio tensor 138B. Because each audio is converted to a tensor using the same audio-to-tensor model, each tensor may be part of the same embedding space. Single loss calculator 140 may calculate a distance between the two tensors within the embedding space to calculate a cycle consistency loss. In some embodiments, single loss calculator 140 may calculate the $L_1$ distance between audio tensors 138A and 138B. In some embodiments, single loss calculator 140 may calculate the $L_2$ distance between audio tensors 138A and 138B. In some embodiments, single loss calculator 140 may calculate a cosine distance and/or cosine similarity between audio tensors 138A-B.

The process may be repeated starting with text data instead of audio data. For example, unlabeled text 152 may be received and may be provided to TTS module 120. Unlabeled text 152 may be a sequence of words, phonemes, international phonetic alphabet (IPA) symbols, and/or the like. In some embodiments, unlabeled text 152 is converted from an initial format (e.g., sequence of words) to an input format that is accepted by TTS module 120 (e.g., sequence of phonemes) before being processed by TTS module 120.

TTS module 120 may convert unlabeled text 152 to synthesized speech 154, which may be an audio representation of unlabeled text 152. Synthesized speech 154 may then be provided to ASR module 110, which may convert synthesized speech 154 back to text (e.g., generated text 156). Unlabeled text 152 may be provided to text-to-tensor module 150 to convert the text to a dense tensor representation (e.g., text tensor 158A). In some embodiments, text-to-tensor module 150 may include a bidirectional encoder representations from transformers (BERT) language model. Text-to-tensor module 150 may be configured to receive a sequence of tokens (e.g., words, phonemes, IPA symbols, etc.) and to output a sequence of vectors within an embedding space that represent each token. The sequence of vectors is a tensor. Single loss calculator 160 may calculate a distance between the two text tensors 158A and 158B within the embedding space to calculate a cycle consistency loss. In some embodiments, the embedding space used by audio-to-tensor module 130 is different than the embedding space used by text-to-tensor module 150. In some embodiments, single loss calculator 140 and single loss calculator 160 may be the same.

The loss from single loss calculator 140 (e.g., audio_loss) and the loss from single loss calculator 160 (e.g., text_loss) may be provided to joint loss calculator 162, which may calculate a joint loss based on a weighted combination of the two losses. For example, joint loss calculator 162 may calculate a joint loss of ASR module and TTS module using the following equation:

$$\mathcal{L}_{joint} = \lambda * \mathcal{L}_{audio\_loss} + (1 - \lambda) * \mathcal{L}_{text\_loss}$$

where $\mathcal{L}_{audio\_loss}$ is based on the output of single loss calculator 140, $\mathcal{L}_{text\_loss}$ is based on the output of single loss calculator 160, and $\lambda$ is a tunable hyperparameter. Based on the calculated $\mathcal{L}_{joint}$, the machine learning model of ASR module 110 and/or the machine learning model of TTS module 120 may be updated to minimize the loss, resulting in improved ASR/TTS performance.

In some embodiments, a machine learning model trained using the joint loss equation defined above may be deployed in a chatbot and/or virtual assistant application. For example, a user may interact with a chatbot, virtual assistant, digital avatar, or the like using speech commands. The chatbot (virtual assistant, digital avatar, etc.) application may use an unsupervised ASR model to convert the user's speech to text before processing the command. In some embodiments, the chatbot application may generate a text response, which may be provided to an unsupervised TTS model to generate synthetic speech based on the text response.

Figure 2A:
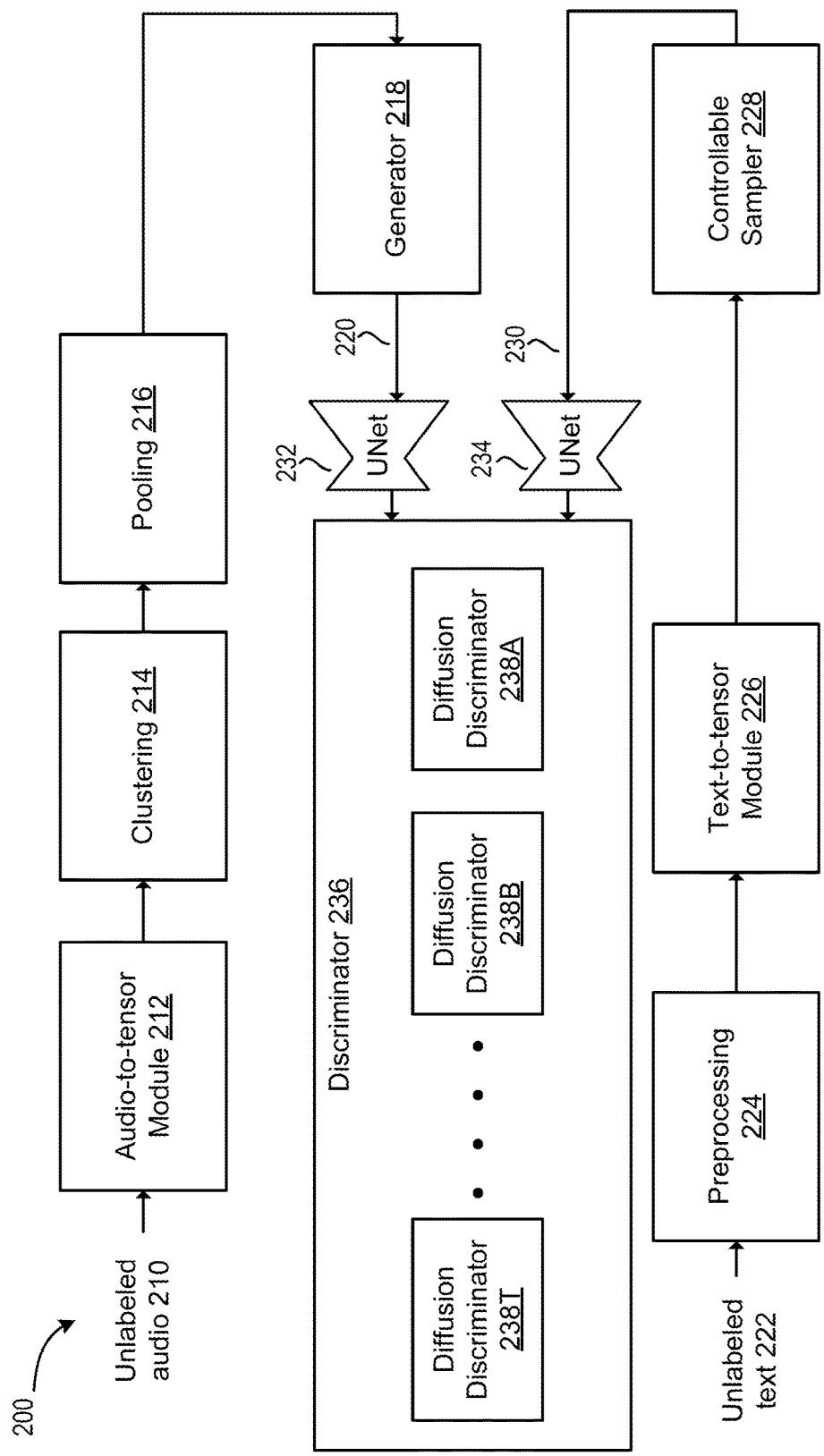
FIGS. 2A-B illustrate example machine learning models used for unsupervised ASR and unsupervised TTS, respectively, according to at least one embodiment.
Figure 2B:
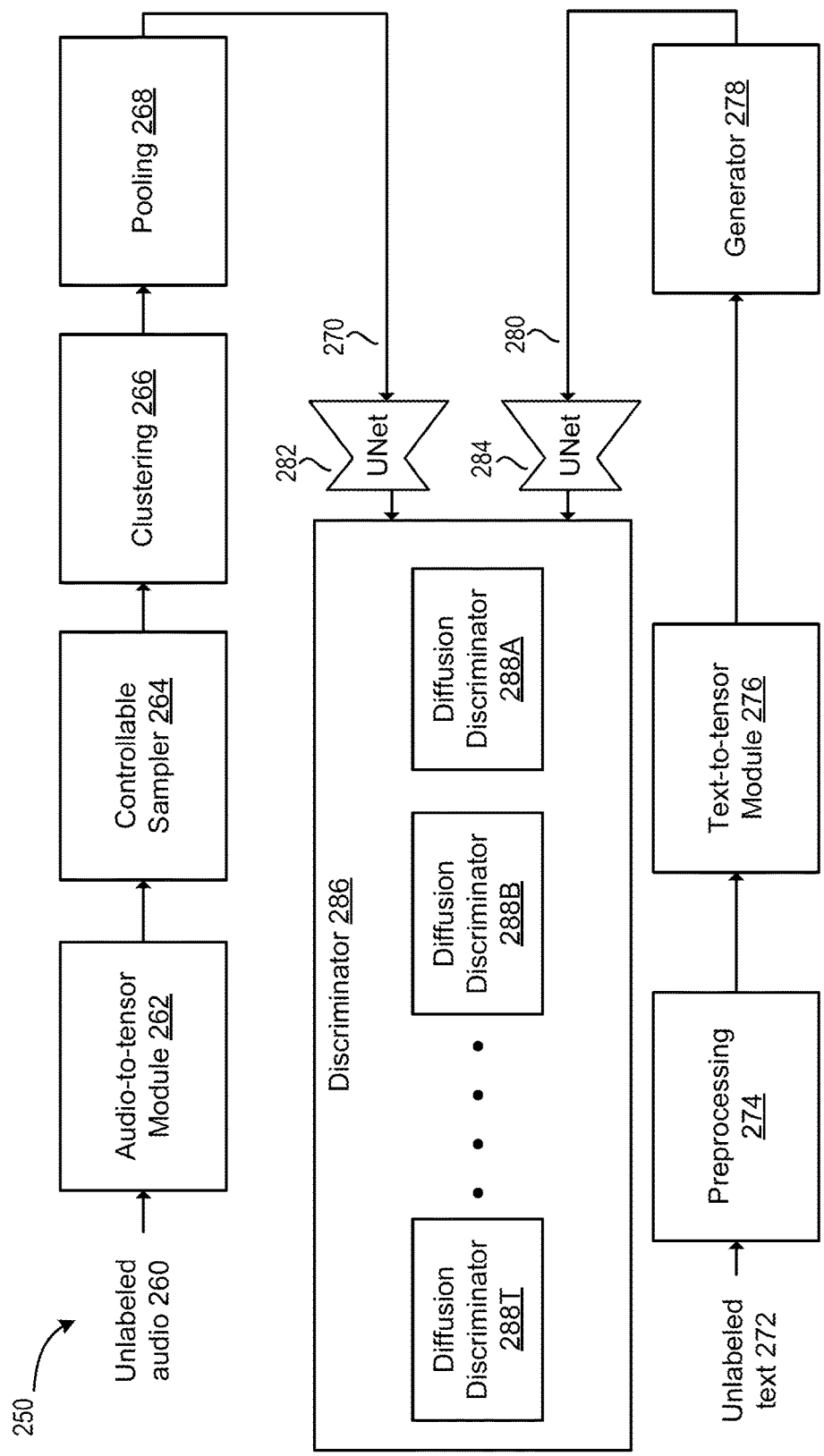

FIGS. 2A-B illustrate example machine learning models 200 and 250 used for unsupervised ASR and unsupervised TTS, respectively, according to at least one embodiment. Machine learning model 200 may be a diffusion-GAN model used to convert speech data to text (e.g., ASR). Machine learning model 200 may include a Transformer-based language model (e.g., text-to-tensor module 226), a convolutional neural network for generating embeddings based on an audio input (e.g., audio-to-tensor module 212), a generator model (e.g., generator 218), and a discriminator model (e.g., discriminator 236) including a plurality of timestep-dependent discriminators (e.g., diffusion discriminator 238A-T). During training of machine learning model 200, unlabeled audio 210 and unlabeled text 222 may be obtained (e.g., from a training dataset). Unlabeled audio 210 and unlabeled text 222 may be unrelated to one another. For example, unlabeled text 222 may not be a textual representation of unlabeled audio 210.

Unlabeled audio 210 may be provided to audio-to-tensor module 212, which may convert unlabeled audio 210 into a tensor including a sequence of vectors within an embedding space. Clustering 214 may cluster the vectors within the tensor (e.g., k-means clustering) by assigning a cluster identifier to each vector for audio segmentation. In some embodiments, clustering 214 may also perform principal component analysis (PCA) to reduce the size (e.g., dimension) of each vector of the tensor. Pooling 216 may then perform mean pooling on the tensor. For example, spans of vectors with similar cluster identifiers (e.g., from the k-means clustering) may be merged together by mean pooling. In some embodiments, a second mean pooling operation is performed between adjacent segments to alter the length of the tensor. The resulting tensor may be provided to generator 218 to create generated text sequence 220 corresponding to unlabeled audio 210. Generated text sequence 220 may include a sequence of words, phonemes, and/or IPA symbols (or vector representations of words, phonemes, and/or IPA symbols).

Unlabeled text 222 may be provided to preprocessing 224, which may insert one or more silence tokens into unlabeled text 222 and may, if necessary, convert unlabeled text 222 from a first format to a second format that is accepted by text-to-tensor module 226. For example, unlabeled text 222 may be a sequence of words and may be converted to a sequence of phonemes or IPA symbols by preprocessing 224. The processed text may be provided to text-to-tensor module 226 which may generate a tensor including a sequence of vectors within an embedding space, each vector representing a token (e.g., word, subword, character, phoneme, IPA symbol, etc.) of the processed text. Text-to-tensor module 226 may include a trained machine learning model that has learned the contextual distribution of phonemes of a given language. In some embodiments, text-to-tensor module 226 may include a Transformer-based machine learning model. For example, text-to-tensor module 226 may be a BERT style language model that receives a sequence of masked phonemes and outputs a new sequence of phonemes (or vector representations of phonemes) matching the same distribution of the received phonemes. Text-to-tensor module 226 may be connected to controllable sampler 228 that may request a number of phonemes (or vector representations of phonemes) from text-to-tensor module 226 based on the resulting length of the audio tensor after pooling 216. Controllable sampler 228 may output a reference text sequence 230 that matches the length of generated text sequence 220. Because reference text sequence 230 may be a generated sequence, reference text sequence 230 may be used as a pseudo ground truth value in discriminator 236. Reference text sequence 230 may include a sequence of words, phonemes, and/or IPA symbols (or vector representations of words, phonemes, and/or IPA symbols).

Generated text sequence 220 may be provided to UNet 232, and reference text sequence 230 may be provided to UNet 234. UNet 232 and UNet 234 may each be a symmetrical (or unsymmetrical) U-shaped neural network for down-sampling and subsequently up-sampling generated text sequence 220 and reference text sequence 230, respectively. For example, UNet 232 (and/or UNet 234) may include layers to down-sample each vector of generated text sequence 220 from 512 dimensions to 256 dimensions to 128 dimensions to 64 dimensions and layers to up-sample each vector from 64 dimensions to 128 dimensions. In some embodiments, there are skip connections between layers of UNet 232 (and/or UNet 234) to preserve features from a first layer in a second layer. For example, there may be a skip connection from the first down-sampling layer to the last up-sampling layer.

The output of UNet 232 and UNet 234 may be provided to discriminator 236, which may learn to discriminate between generated text sequence 220 and reference text sequence 230. Discriminator 236 may include one or more diffusion discriminators 238A-T. Each diffusion discriminator 238A-T may represent a timestep t between 0 and T. Individual diffusion discriminators 238A-T may receive, as input, the output of UNet 232 (e.g., the result of processing generated text sequence 220) and may receive, as a target output, the output of UNet 234 (e.g., the result of processing reference text sequence 230). Individual diffusion discriminators 238A-T may add noise to the input and target output to increase a robustness of generator 218. Each diffusion discriminator may add noise based on their corresponding timestep, $t \in [0, T]$. For example, diffusion discriminator 238A (at t=0) may add no noise (or a small amount of noise) to its input and target output. Diffusion discriminator 238B (at t=1) may add more noise than diffusion discriminator 238A added. Each subsequent diffusion discriminator may add more noise than the previous diffusion discriminator, until reaching a final diffusion discriminator 238T (at t=T) (e.g., diffusion process). Individual diffusion discriminator 238A-T may output a result indicating whether the input text was generated text or (pseudo) reference text. Based on the results of each diffusion discriminator 238A-T, generator 218 may be updated (e.g., through back-propagation) to generate text sequences that better align with the phoneme distribution of the trained language model of text-to-tensor module 226.

During an inference stage using machine learning model 200 for ASR, novel audio data may be provided to audio-to-tensor module 212. The output may go through clustering 214 and pooling 216 to reach generator 218, which may output a text sequence representing the novel audio.

Referring to FIG. 2B, machine learning model 250 may be a diffusion-GAN model used to convert text to synthesized speech. Machine learning model 250 may include a Transformer-based language model (e.g., text-to-tensor module 276), a convolutional neural network for generating embeddings based on an audio input (e.g., audio-to-tensor module 262), a generator model (e.g., generator 278), and a discriminator model (e.g., discriminator 286) including a plurality of timestep-dependent discriminators (e.g., diffusion discriminator 288A-T). During training of machine learning model 250, unlabeled text 272 and unlabeled audio 260 may be obtained (e.g., from a training dataset). Unlabeled text 272 and unlabeled audio 260 may be unrelated to one another.

Unlabeled text 272 may be provided to preprocessing 274, which insert one or more silence tokens into unlabeled text 272 and may, if necessary, convert unlabeled text 272 from a first format to a second format that is accepted by text-to-tensor module 276. The processed text may be provided to text-to-tensor module 276 which may generate a tensor including a sequence of vectors within an embedding space, each vector representing a token (e.g., word, phoneme, IPA symbol, etc.) of the processed text. Text-to-tensor module 276 may include a trained machine learning model that has learned the contextual distribution of phonemes of a given language. The resulting tensor may be provided to generator 278 to create generated audio sequence 280 corresponding to unlabeled text 272. Generated audio sequence 280 may include a sequence of mel-spectrograms (or vector representations of mel-spectrograms) that can be converted to an audio file (e.g., WAV file) via post-processing (e.g., using a vocoder).

Unlabeled audio 260 may be provided to audio-to-tensor module 262, which may convert unlabeled audio 260 into a tensor including a sequence of vectors within an embedding space. Audio-to-tensor module 262 may be connected to controllable sampler 264 that may request a number of audio segments (or vector representations of audio segments) from audio-to-tensor module 262 based on the resulting length of the text tensor output of text-to-tensor module 276. Controllable sampler 264 may output audio segments that may be clustered (e.g., k-means clustering) by clustering 266. Pooling 268 may perform mean pooling on the resulting tensor and may output reference audio sequence 270. Reference audio sequence 270 may include a sequence of mel-spectrograms (or vector representations of mel-spectrograms) that can be converted to an audio file (e.g., WAV file) via post-processing (e.g., using a vocoder).

Generated audio sequence 280 may be provided to UNet 284, and reference audio sequence 270 may be provided to UNet 282. UNet 284 and UNet 282 may each be a symmetrical (or unsymmetrical) U-shaped neural network for down-sampling and subsequently up-sampling generated audio sequence 280 and reference audio sequence 270, respectively. In some embodiments, there are skip connections between layers of UNet 284 (and/or UNet 282) to preserve features from a first layer in a second layer.

The output of UNet 284 and UNet 282 may be provided to discriminator 286, which may learn to discriminate between generated audio sequence 280 and reference audio sequence 270. Discriminator 286 may include one or more diffusion discriminators 288A-T. Each diffusion discriminator 288A-T may represent a timestep between 0 and T. Individual diffusion discriminators 288A-T may receive, as input, the output of UNet 284 (e.g., the result of processing generated audio sequence 280) and may receive, as target output, the output of UNet 282 (e.g., the result of processing reference audio sequence 270). Individual diffusion discriminators 288A-T may add noise to the input and target output to increase a robustness of generator 278, similar to diffusion discriminators 238A-T of FIG. 2B. Individual diffusion discriminator 288A-T may output a result indicating whether the input text was generated audio or reference audio. Based on the results of each diffusion discriminator 288A-T, generator 278 may be updated (e.g., through backpropagation) to generate audio sequences that better align with the audio segments generated by audio-to-tensor module 262.

During an inference stage using machine learning model 250 for TTS, novel text data may be provided to preprocessing 274 and then to text-to-tensor module 276. The resulting tensor may be provided to generator 278, which may output a sequence of mel-spectrograms (or vector representations of mel-spectrograms) representing the novel text data. The output of generator 278 may be converted to an audio wave file (e.g., WAV file) via post-processing (e.g., using a vocoder).

In some embodiments, audio-to-tensor module 212 is the same as audio-to-tensor module 262. In some embodiments, text-to-tensor module 226 is the same as text-to-tensor module 276. In some embodiments, machine learning model 200 may be the machine learning model of ASR module 110 of FIG. 1. In some embodiments, machine learning model 250 may be the machine learning model of TTS module 120 of FIG. 1.

In some embodiments, machine learning model 250 may be used to generate labeled training data to train supervised TTS models (e.g., Tacotron2, fastpitch, etc.). The tensor from text-to-tensor module 276 may be provided as training input, along with unlabeled audio 260 (or a sequence of mel-spectrograms representing unlabeled audio 260) as training target output, to a supervised TTS model. To ensure a high quality of training data, only text tensors and corresponding unlabeled audio with a discriminator result that exceeds a predetermined threshold may be provided as training data. For example, discriminator 286 may output a value indicating a confidence that generated audio sequence 280 (based on the text tensor from text-to-tensor module 276) is reference audio (e.g., not generated audio). If the confidence value exceeds a predetermined threshold (e.g., 90%), the text tensor and corresponding unlabeled audio may be provided as training data for a supervised TTS model.

Figure 3:
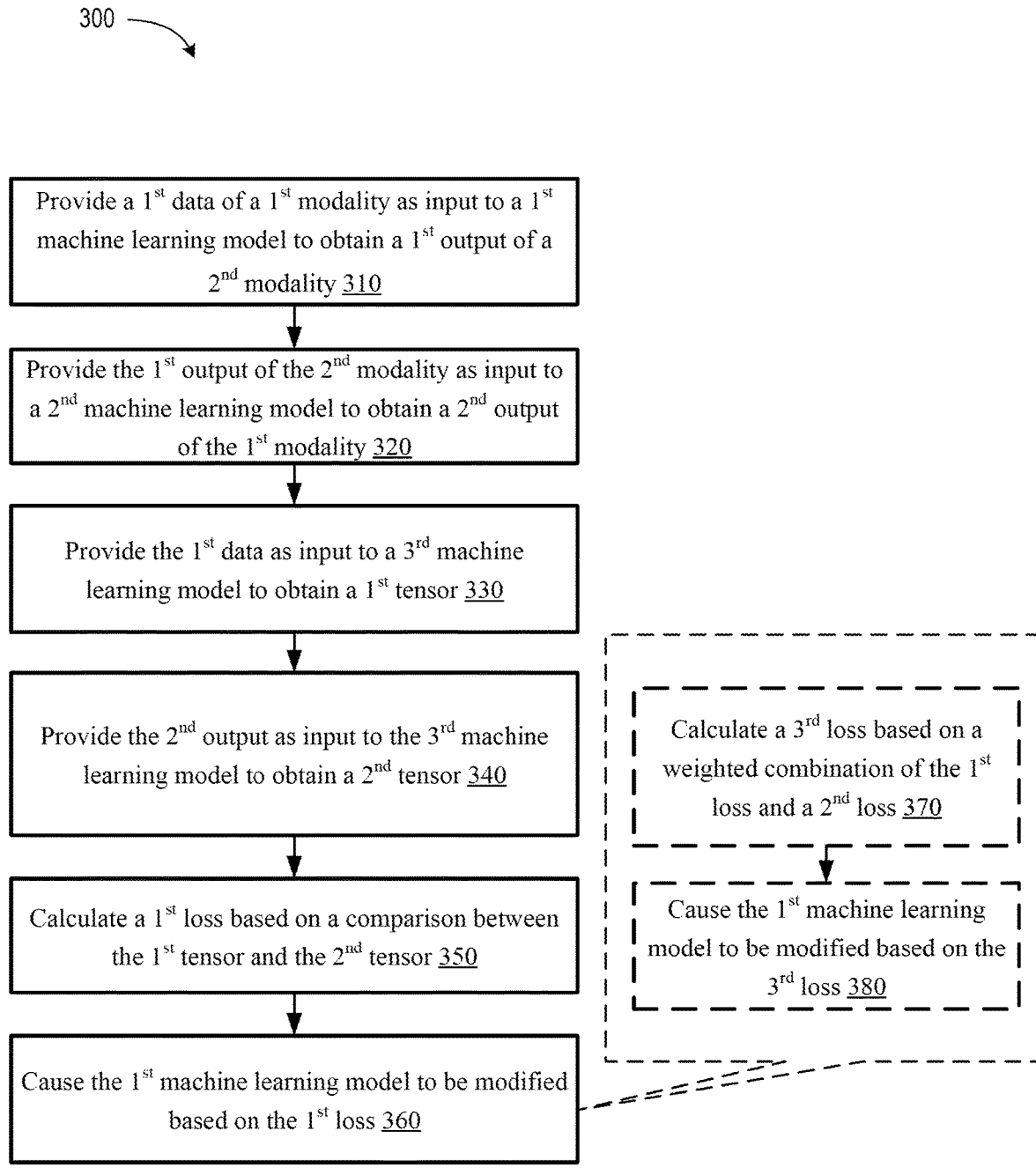
FIG. 3 is a flow diagram of an example method of training an unsupervised ASR and/or unsupervised TTS model, according to at least one embodiment.
Figure 4:
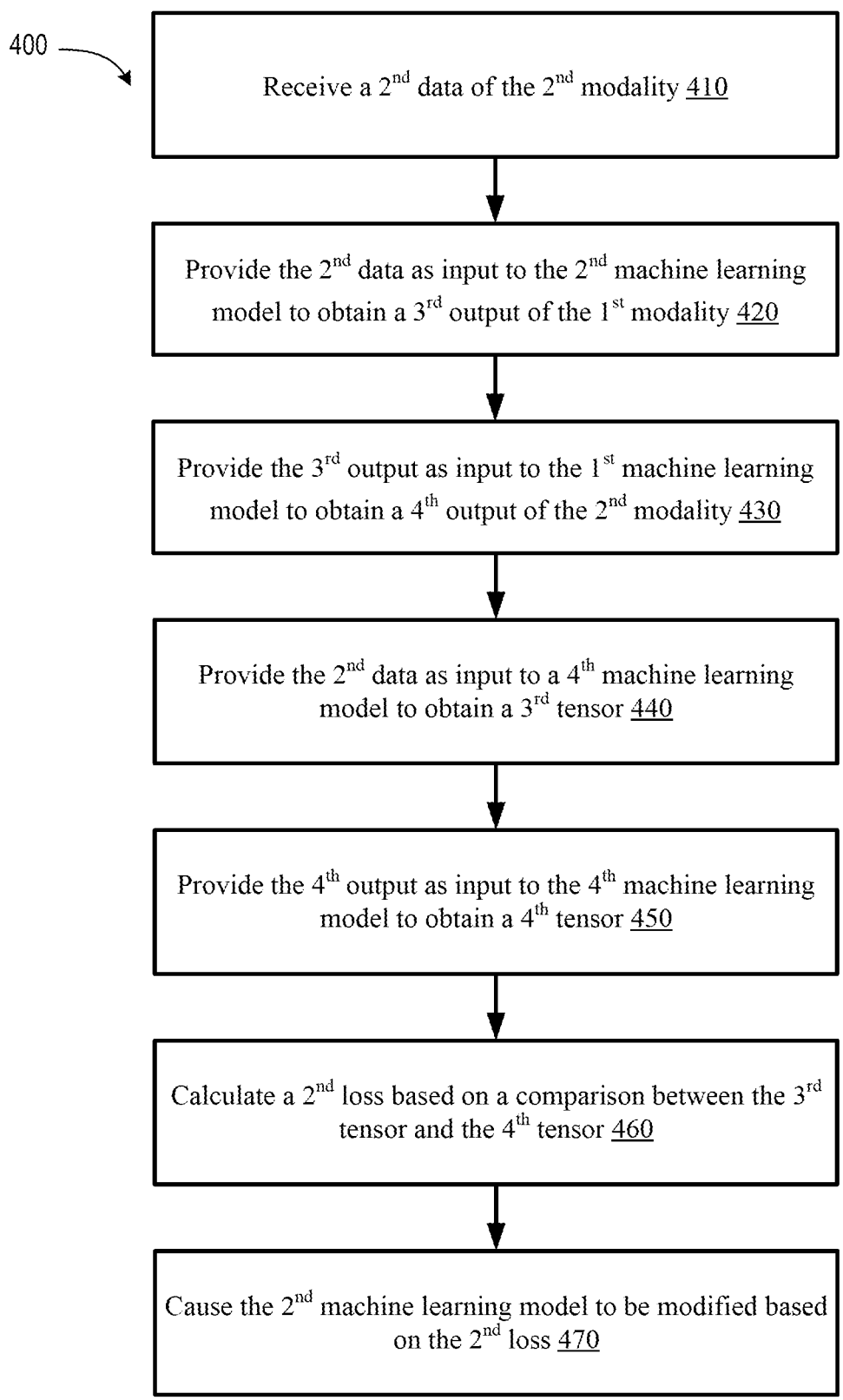
FIG. 4 is a flow diagram of an example method of training an unsupervised ASR and/or unsupervised TTS model, according to at least one embodiment.

FIGS. 3-4 are flow diagrams of example methods 300 and 400 of training an unsupervised ASR and/or unsupervised TTS model, according to at least one embodiment. Methods 300 and 400 may be performed using one or more processing units (e.g., CPUs, GPUS, accelerators, physic processing units (PPUs), data processing units (DPUs), etc.), which may include (or communicate with) one or more memory devices. In at least one embodiment, methods 300 and 400 may be performed by example computing device 500. In at least one embodiment, processing units performing any of methods 300 and 400 may be executing instructions stored on a non-transitory computer-readable storage media. In at least one embodiment, any of methods 300 and 400 may be performed using multiple processor threads (e.g., CPU threads and/or GPU threads), individual threads executing one or more individual functions, routines, subroutines, or operations of the method. In at least one embodiment, processing threads implementing any of methods 300 and 400 may be synchronized (e.g., using semaphores, critical sections, and/or other thread synchronization mechanisms). Alternatively, processing threads implementing any of methods 300 and 400 may be executed asynchronously with respect to each other. Various operations of methods 300 and 400 may be performed in a different order compared with the order shown in FIGS. 3-4. Some operations of methods 300 and 400 may be performed concurrently with other operations. In at least one embodiment, one or more operations shown in FIGS. 3-4 may not always be performed.

FIG. 3 is a flow diagram of an example method 300 of training an unsupervised ASR and/or unsupervised TTS model, according to at least one embodiment. At block 310, one or more processing devices performing method 300 may provide a first data of a first modality as input to a first machine learning model to obtain a first output of a second modality. In some embodiments, the first modality may be text and the second modality may be audio, or vice versa. For example, the first modality may be text-based while the second modality may be audio-based, and the first machine learning model may convert the text data to an audio output. At block 320, the one or more processing devices may provide the first output of the second modality as input to a second machine learning model to obtain a second output of the first modality. Continuing the previous example, the audio output may be provided to a second machine learning model that converts the audio data to a text output. At block 330, the one or more processing devices may provide the first data as input to a third machine learning model to obtain a first tensor. In some embodiments, the third machine learning model is a text-to-tensor machine learning model, such as a BERT-style language model. In some embodiments, the third machine learning model is an audio-to-tensor machine learning model, such as Wav2Vec.

At block 340, the one or more processing devices may provide the second output as input to the third machine learning model to obtain a second tensor. For example, the first data may be of the first modality and the second output may also be of the first modality. Both the first data and the second output may be provided to the third machine learning model to obtain a corresponding tensor representation of the data/output. At block 350, the one or more processing devices may calculate a first loss based on a comparison between the first tensor and the second tensor. The first loss may be based on a distance (e.g., $L_1$ distance, $L_2$ distance, cosine distance, etc.) between the tensors within the corresponding embedding space. The first loss may be cycle consistency loss of the first machine learning model. At block 360, the one or more processing devices may cause the first machine learning model to be modified based on the first loss. In some embodiments, the one or more processing devices may also cause the second machine learning model to be modified based on the first loss.

In some embodiments, block 360 may be performed using the steps in the callout block. For example, at block 370, the one or more processing devices may calculate a third loss based on a weighted combination of the first loss and a second loss. In some embodiments, the second loss may be calculated as described below in relation to method 400. At block 380, the one or more processing devices may cause the first machine learning model to be modified based on the third loss. In some embodiments, the one or more processing devices may cause the second machine learning to be modified based on the third loss.

FIG. 4 is a flow diagram of an example method 400 of training an unsupervised ASR and/or unsupervised TTS model, according to at least one embodiment. In some embodiments, method 400 may be performed after blocks 310-350 of method 300. At block 410, one or more processing devices implementing method 400 may receive a second data of the second modality. At block 420, the one or more processing devices may provide the second data as input to the second machine learning model to obtain a third output of the first modality. At block 430, the one or more processing devices may provide the third output as input to the first machine learning model to obtain a fourth output of the second modality. For example, during method 300, a first text data may have been converted to audio data and then back to speech data. Continuing the example, in method 400, a first audio data may be converted to text data and then back to audio data.

At block 440, the one or more processing devices may provide the second data as input to a fourth machine learning model to obtain a third tensor. At block 450, the one or more processing devices may provide the fourth output as input to the fourth machine learning model to obtain a fourth tensor. At block 460, the one or more processing devices may calculate a second loss based on a comparison between the third tensor and the fourth tensor. The second loss may be based on a distance (e.g., $L_1$ distance, $L_2$ distance, cosine distance, etc.) between the third tensor and the fourth tensor within the corresponding embedding space. The second loss may be a cycle consistency loss of the second machine learning model. At block 470, the one or more processing devices may cause the second machine learning model to be modified based on the second loss. In some embodiments, the one or more processing devices cause the first machine learning model to be modified based on the second loss.

Figure 5:
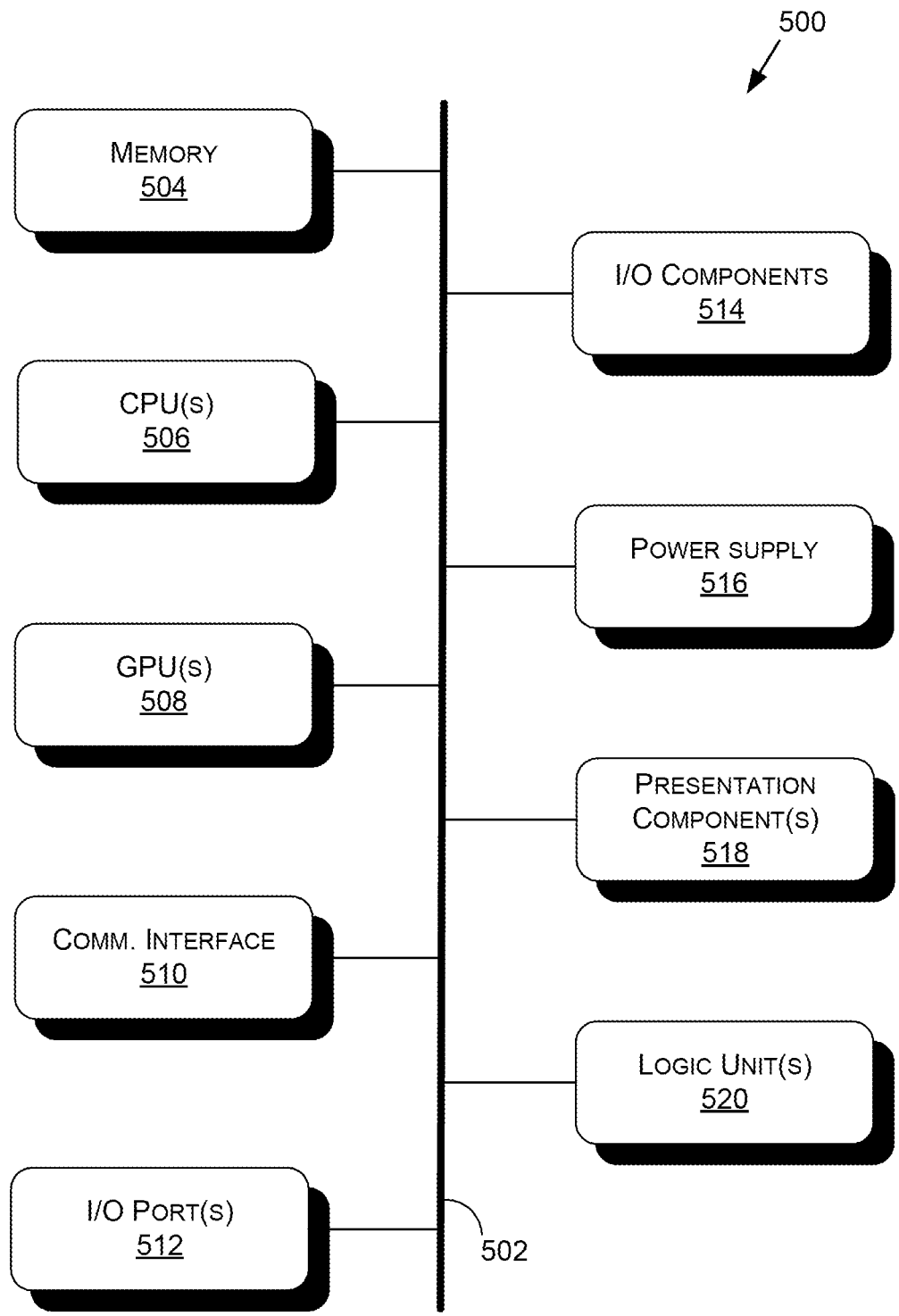
FIG. 5 is a block diagram of an example computing device suitable for training and/or deploying an unsupervised ASR and/or unsupervised TTS model, in accordance with at least some embodiments.

FIG. 5 is a block diagram of an example computing device(s) 500 suitable for training and/or deploying an unsupervised ASR and/or unsupervised TTS model, in accordance with at least some embodiments. Computing device 500 may include an interconnect system 502 that directly or indirectly couples the following devices: memory 504, one or more central processing units (CPUs) 506, one or more graphics processing units (GPUs) 508, a communication interface 510, input/output (I/O) ports 512, input/output components 514, a power supply 516, one or more presentation components 518 (e.g., display(s)), and one or more logic units 520. In at least one embodiment, the computing device(s) 500 may comprise one or more virtual machines (VMs), and/or any of the components thereof may comprise virtual components (e.g., virtual hardware components). For non-limiting examples, one or more of the GPUs 508 may comprise one or more vGPUs, one or more of the CPUs 506 may comprise one or more vCPUs, and/or one or more of the logic units 520 may comprise one or more virtual logic units. As such, a computing device(s) 500 may include discrete components (e.g., a full GPU dedicated to the computing device 500), virtual components (e.g., a portion of a GPU dedicated to the computing device 500), or a combination thereof.

Although the various blocks of FIG. 5 are shown as connected via the interconnect system 502 with lines, this is not intended to be limiting and is for clarity only. For example, in some embodiments, a presentation component 518, such as a display device, may be considered an I/O component 514 (e.g., if the display is a touch screen). As another example, the CPUs 506 and/or GPUs 508 may include memory (e.g., the memory 504 may be representative of a storage device in addition to the memory of the GPUs 508, the CPUs 506, and/or other components). In other words, the computing device of FIG. 5 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5.

The interconnect system 502 may represent one or more links or busses, such as an address bus, a data bus, a control bus, or a combination thereof. The interconnect system 502 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 506 may be directly connected to the memory 504. Further, the CPU 506 may be directly connected to the GPU 508. Where there is direct, or point-to-point connection between components, the interconnect system 502 may include a PCIe link to carry out the connection. In these examples, a PCI bus need not be included in the computing device 500.

The memory 504 may include any of a variety of computer-readable media. The computer-readable media may be any available media that may be accessed by the computing device 500. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 504 may store computer-readable instructions (e.g., that represent a program(s) and/or a program element(s)), such as an operating system. In accordance with one or more aspects of the present disclosure, the computer-readable instructions can comprise executable instructions for executing method 300 and/or method 400 of training an unsupervised ASR and/or unsupervised TTS model. Computer-storage media may include, but is not limited to, random-access memory (RAM), read-only memory (ROM), electronically erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other medium which may be used to store the desired information and which may be accessed by computing device 500. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, radio frequency (RF), infrared and other wireless media. Combinations of any of the above should also be included within the scope of computer-readable media.

The CPU(s) 506 may be configured to execute at least some of the computer-readable instructions to control one or more components of the computing device 500 to perform one or more of the methods and/or processes described herein. For example, in accordance with one or more aspects of the present disclosure, the CPU(s) 506 may be configured to execute instructions executing methods 300-400 of training an unsupervised ASR and/or unsupervised TTS model. The CPU(s) 506 may each include one or more cores (e.g., one, two, four, eight, twenty-eight, seventy-two, etc.) that are capable of handling a multitude of software threads simultaneously. The CPU(s) 506 may include any type of processor, and may include different types of processors depending on the type of computing device 500 implemented (e.g., processors with fewer cores for mobile devices and processors with more cores for servers). For example, depending on the type of computing device 500, the processor may be an Advanced RISC Machines (ARM) processor implemented using Reduced Instruction Set Computing (RISC) or an x86 processor implemented using Complex Instruction Set Computing (CISC). The computing device 500 may include one or more CPUs 506 in addition to one or more microprocessors or supplementary co-processors, such as math co-processors.

In addition to or alternatively from the CPU(s) 506, the GPU(s) 508 may be configured to execute at least some of the computer-readable instructions to control one or more components of the computing device 500 to perform one or more of the methods and/or processes described herein. One or more of the GPU(s) 508 may be an integrated GPU (e.g., with one or more of the CPU(s) 506 and/or one or more of the GPU(s) 508 may be a discrete GPU. In embodiments, one or more of the GPU(s) 508 may be a coprocessor of one or more of the CPU(s) 506. The GPU(s) 508 may be used by the computing device 500 to render graphics (e.g., 3D graphics) or perform general purpose computations. For example, the GPU(s) 508 may be used for General-Purpose computing on GPUs (GPGPU). The GPU(s) 508 may include hundreds or thousands of cores that are capable of handling hundreds or thousands of software threads simultaneously. The GPU(s) 508 may generate pixel data for output images in response to rendering commands (e.g., rendering commands from the CPU(s) 506 received via a host interface). The GPU(s) 508 may include graphics memory, such as display memory, for storing pixel data or any other suitable data, such as GPGPU data. The display memory may be included as part of the memory 504. The GPU(s) 508 may include two or more GPUs operating in parallel (e.g., via a link). The link may directly connect the GPUs (e.g., using NVLINK) or may connect the GPUs through a switch (e.g., using NVSwitch). When combined together, each GPU 508 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 506 and/or the GPU(s) 508, the logic unit(s) 520 may be configured to execute at least some of the computer-readable instructions to control one or more components of the computing device 500 to perform one or more of the methods and/or processes described herein. In embodiments, the CPU(s) 506, the GPU(s) 508, and/or the logic unit(s) 520 may discretely or jointly perform any combination of the methods, processes and/or portions thereof. One or more of the logic units 520 may be part of and/or integrated in one or more of the CPU(s) 506 and/or the GPU(s) 508 and/or one or more of the logic units 520 may be discrete components or otherwise external to the CPU(s) 506 and/or the GPU(s) 508. In embodiments, one or more of the logic units 520 may be a coprocessor of one or more of the CPU(s) 506 and/or one or more of the GPU(s) 508.

Examples of the logic unit(s) 520 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 510 may include one or more receivers, transmitters, and/or transceivers that enable the computing device 500 to communicate with other computing devices via an electronic communication network, included wired and/or wireless communications. The communication interface 510 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 520 and/or communication interface 510 may include one or more data processing units (DPUs) to transmit data received over a network and/or through interconnect system 502 directly to (e.g., a memory of) one or more GPU(s) 508.

The I/O ports 512 may enable the computing device 500 to be logically coupled to other devices including the I/O components 514, the presentation component(s) 518, and/or other components, some of which may be built in to (e.g., integrated in) the computing device 500. Illustrative I/O components 514 include a microphone, mouse, keyboard, joystick, game pad, game controller, satellite dish, scanner, printer, wireless device, etc. The I/O components 514 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 500. The computing device 500 may be include depth cameras, such as stereoscopic camera systems, infrared camera systems, RGB camera systems, touchscreen technology, and combinations of these, for gesture detection and recognition. Additionally, the computing device 500 may include accelerometers or gyroscopes (e.g., as part of an inertia measurement unit (IMU)) that enable detection of motion. In some examples, the output of the accelerometers or gyroscopes may be used by the computing device 500 to render immersive augmented reality or virtual reality.

The power supply 516 may include a hard-wired power supply, a battery power supply, or a combination thereof. The power supply 516 may provide power to the computing device 500 to enable the components of the computing device 500 to operate.

The presentation component(s) 518 may include a display (e.g., a monitor, a touch screen, a television screen, a heads-up-display (HUD), other display types, or a combination thereof), speakers, and/or other presentation components. The presentation component(s) 518 may receive data from other components (e.g., the GPU(s) 508, the CPU(s) 506, DPUs, etc.), and output the data (e.g., as an image, video, sound, etc.).

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 500 of FIG. 5—e.g., each device may include similar components, features, and/or functionality of the computing device(s) 500.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 500 described herein with respect to FIG. 5. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but may be more when so indicated either explicitly or by context. Further, unless stated otherwise or otherwise clear from context, phrase "based on" means "based at least in part on" and not "based solely on."

Operations of processes described herein may be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data may be accomplished in a variety of ways such as by receiving data as a parameter of a function call or a call to an application programming interface. In some implementations, process of obtaining, acquiring, receiving, or inputting analog or digital data may be accomplished by transferring data via a serial or parallel interface. In another implementation, process of obtaining, acquiring, receiving, or inputting analog or digital data may be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data may be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
   providing first data of a first modality as input to a first machine learning model to obtain a first output of a second modality, wherein the first modality and the second modality comprise at least one of a text-based modality or an audio-based modality and are distinct from one another;
   providing the first output of the second modality as input to a second machine learning model to obtain a second output of the first modality, at least one of the first machine learning model or the second machine learning model being based at least on a diffusion generative adversarial network (diffusion-GAN) model that includes a discriminator comprising a plurality of timestep-dependent discriminators;
   providing the first data as input to a third machine learning model to obtain a first tensor;
   providing the second output as input to the third machine learning model to obtain a second tensor;
   calculating a loss based at least on a comparison between the first tensor and the second tensor; and
   updating one or more parameters of the first machine learning model based at least on the loss.

2. The method of claim 1, further comprising updating one or more parameters of the second machine learning model based at least on the loss.

3. The method of claim 1, further comprising:
   receiving second data of the second modality;
   providing the second data as input to the second machine learning model to obtain a third output of the first modality;
   providing the third output as input to the first machine learning model to obtain a fourth output of the second modality;
   providing the second data as input to a fourth machine learning model to obtain a third tensor;
   providing the fourth output as input to the fourth machine learning model to obtain a fourth tensor;
   calculating a second loss based at least on a comparison between the third tensor and the fourth tensor; and
   updating the one or more parameters of the second machine learning model based at least on the second loss.

4. The method of claim 3, wherein the updating the one or more parameters of the first machine learning model is further based at least on a weighted combination of the loss and the second loss.

5. The method of claim 1, wherein the first machine learning model is an unsupervised text-to-speech model and the second machine learning model is an unsupervised automatic speech recognition model.

6. The method of claim 5, wherein the unsupervised text-to-speech model is based at least on the diffusion-GAN model, and wherein the diffusion-GAN model further comprises:

a Transformer-based language model;
a convolutional neural network for generating embeddings based at least on an audio input; and
a generator model.

7. The method of claim 1, wherein the first machine learning model is an unsupervised automatic speech recognition model and the second machine learning model is an unsupervised text-to-speech model.

8. A method comprising:
applying a first deployed machine learning model to first data of a first modality to obtain a second data of a second modality, wherein the first deployed machine learning model is trained, at least in part, by:
providing a first training data of the first modality as input to a first machine learning model to obtain a first output of the second modality, wherein the first modality and the second modality comprise at least one of a text-based modality or an audio-based modality and are distinct from one another;
providing the first output of the second modality as input to a second machine learning model to obtain a second output of the first modality, at least one of the first machine learning model or the second machine learning model being based at least on a diffusion generative adversarial network (diffusion-GAN) model that includes a discriminator comprising a plurality of timestep-dependent discriminators;
providing the first training data as input to a third machine learning model to obtain a first tensor;
providing the second output as input to the third machine learning model to obtain a second tensor;
calculating a loss based at least on a comparison between the first tensor and the second tensor; and
causing the first machine learning model to be modified based at least on the loss, wherein the first machine learning model, after training, represents the first deployed machine learning model.

9. The method of claim 8, further comprising:
receiving third data of the second modality;
applying a second deployed machine learning model to the third data to obtain fourth data of the first modality, wherein the second deployed machine learning model is trained, at least in part, by:
receiving second training data of the second modality;
providing the second training data as input to the second machine learning model to obtain a third output of the first modality;
providing the third output as input to the first machine learning model to obtain a fourth output of the second modality;
providing the second training data as input to a fourth machine learning model to obtain a third tensor;
providing the fourth output as input to the fourth machine learning model to obtain a fourth tensor;
calculating a second loss based at least on a comparison between the third tensor and the fourth tensor; and
causing the second machine learning model to be modified based at least on the second loss, wherein the second machine learning model, after training, represents the second deployed machine learning model.

10. The method of claim 9, wherein the causing the first machine learning model to be modified is further based at least on a weighted combination of the loss and the second loss.

11. The method of claim 8, wherein the first machine learning model is an unsupervised text-to-speech model and the second machine learning model is an unsupervised automatic speech recognition model.

12. The method of claim 11, wherein the unsupervised automatic speech recognition model is based at least on the diffusion-GAN model, and wherein the diffusion-GAN model further comprises:
a Transformer-based language model;
a convolutional neural network for generating embeddings based at least on an audio input; and
a generator model.

13. The method of claim 8, wherein the first machine learning model is an unsupervised automatic speech recognition model and the second machine learning model is an unsupervised text-to-speech model.

14. A system comprising:
one or more processing units to perform one or more operations using a deployed machine learning model, the deployed machine learning model trained, at least in part, using a loss function that penalizes a difference between a first tensor representation of first audio data and a second tensor representation of second audio data, the second audio data generated, at least in part, by converting the first audio data to text data and converting the text data to the second audio data, wherein the deployed machine learning model is based at least on a diffusion generative adversarial network (diffusion-GAN) model that includes a discriminator comprising a plurality of timestep-dependent discriminators.

15. The system of claim 14, wherein the converting the text data to the second audio data is performed using a text-to-speech model.

16. The system of claim 14, wherein the system is comprised in at least one of:
a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for 3D assets;
a system for performing deep learning operations;
a system implemented using an edge device;
a system for generating or presenting at least one of augmented reality content, virtual reality content, or mixed reality content;
a system implemented using a robot;
a system for performing conversational AI operations;
a system implementing one or more large language models (LLMs);
a system for generating synthetic data;
a system incorporating one or more virtual machines (VMs);
a system implemented at least partially in a data center; or
a system implemented at least partially using cloud computing resources.

* * * * *